US012680198B2

(12) United States Patent
Zhang et al.

(10) Patent No.: US 12,680,198 B2
(45) Date of Patent: Jul. 14, 2026

(54) SUPER-TOUGH CELLULOSE AEROGEL FIBER AS WELL AS PREPARATION METHOD AND USE THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Xuetong Zhang, Suzhou (CN);
Zhongsheng Liu, Suzhou (CN);
Zengwei Liu, Suzhou (CN)

(73) Assignee: SUZHOU INSTITUTE OF NANO-TECH AND NANO-BIONICS (SINANO) , CHINESE ACADEMY OF SCIENCES, Suzhou (CN)

( * ) Notice: Subject to any disclaimer, the term of this patent is extended or adjusted under 35 U.S.C. 154(b) by 0 days.

(21) Appl. No.: 18/878,696

(22) PCT Filed: Jun. 5, 2024

(86) PCT No.: PCT/CN2024/097559
§ 371 (c)(1),
(2) Date: Dec. 24, 2024

(87) PCT Pub. No.: WO2025/001789
PCT Pub. Date: Jan. 2, 2025

(65) Prior Publication Data
US 2026/0002288 A1 Jan. 1, 2026

(30) Foreign Application Priority Data
Jun. 25, 2023 (CN) ......................... 202310753071.8

(51) Int. Cl.
D01D 5/06 (2006.01)
C08B 1/00 (2006.01)
(Continued)

(52) U.S. Cl.
CPC ............... D01D 5/06 (2013.01); C08B 1/003 (2013.01); D01D 10/02 (2013.01); D01F 1/02 (2013.01);
(Continued)

(58) Field of Classification Search
CPC ............ D01D 5/06; D01D 10/02; D01D 1/02; D01D 5/247; C08B 1/003; D01F 1/02;
(Continued)

(56) References Cited

FOREIGN PATENT DOCUMENTS

| CN | 101328626 A | 12/2008 |
| CN | 101492337 A | 7/2009 |

(Continued)

OTHER PUBLICATIONS

Qihua Li, "Tough, Highly Oriented, Super Thermal Insulating Regenerated All-Cellulose Sponge-Aerogel Fibers Integrating a Graded Aligned Nanostructure," NanoLetters, 2022, 22 pp. 3516-3524. (Year: 2022).*

(Continued)

*Primary Examiner* — Matthew D Matzek
(74) *Attorney, Agent, or Firm* — Bayramoglu Law Offices LLC

(57) ABSTRACT

A super-tough cellulose aerogel fiber, as well as its preparation method and applications are provided. Specifically, the method includes employing a wet spinning technique; preparing a molecular-level cellulose solution using a cellulose polymer as the raw material; using the molecular-level cellulose solution as the spinning solution, wherein during the spinning process, the cellulose polymer undergoes in-situ self-assembly and hydrogen bonding crosslinking to form a multi-level nanofiber structure, wherein the nanofiber structure is a continuous three-dimensional multi-level pore network structure. The super-tough cellulose aerogel fiber not only has excellent physical properties such
(Continued)

as high strength and high toughness, but also possesses good adsorption and heat preservation performance due to a multi-level porous structure, so that the super-tough cellulose aerogel fiber can be applied to weaving and other technical fields, and is widely applied.

19 Claims, 9 Drawing Sheets

(51) Int. Cl.
| | |
|---|---|
| *D01D 10/02* | (2006.01) |
| *D01F 1/02* | (2006.01) |
| *D01F 2/02* | (2006.01) |
| *D01F 11/02* | (2006.01) |

(52) U.S. Cl.
CPC .............. *D01F 2/02* (2013.01); *D01F 11/02* (2013.01); *D10B 2201/22* (2013.01); *D10B 2401/063* (2013.01); *D10B 2401/10* (2013.01)

(58) Field of Classification Search
CPC ... D01F 2/02; D01F 11/02; D01F 2/00; D10B 2201/22; D10B 2401/063; D10B 2401/10; C08J 2301/02; C08J 3/096
USPC ........................................................ 428/401
See application file for complete search history.

(56) References Cited

FOREIGN PATENT DOCUMENTS

| CN | 104520477 | A | 4/2015 |
|---|---|---|---|
| CN | 105970325 | A | 9/2016 |
| CN | 105970326 | A | 9/2016 |
| CN | 106012107 | A | 10/2016 |
| CN | 113215828 | A | 8/2021 |
| CN | 115073803 | A | 9/2022 |
| CN | 116791225 | A | 9/2023 |
| KR | 101472096 | B1 | 12/2014 |

OTHER PUBLICATIONS

Beini Zeng, et al., The effect of drying method on the porosity of regenerated cellulose fibres, Cellulose, 2021, pp. 8333-8342, vol. 28 No. 13.

Qin-Yong Mi, et al., Flexible and Transparent Cellulose Aerogels with Uniform Nanoporous Structure by a Controlled Regeneration Process, ACS Sustainable Chem. Eng., 2016, pp. 656-660, vol. 4 No.3.

Zhongsheng Liu, et al., Ionic Liquid Directed Spinning of Cellulose Aerogel Fibers with Superb Toughness for Weaved Thermal Insulation and Transient Impact Protection, ACS Nano, 2023, pp. 18411-18420, vol. 17.

Young Jae Lee, et al., Structure and Mechanical Properties of Regenerated Cellulose Fibers Wet-Spun from Ionic Liquid/Cosolvent Systems, Fibers and Polymers, 2019, pp. 501-511, vol. 20, No. 3.

* cited by examiner

SUPER-TOUGH CELLULOSE AEROGEL FIBER AS WELL AS PREPARATION METHOD AND USE THEREOF

CROSS REFERENCE TO THE RELATED APPLICATIONS

This application is the national phase entry of International Application No. PCT/CN2024/097559, filed on Jun. 5, 2024, which is based upon and claims priority to Chinese Patent Application No. 202310753071.8, filed on Jun. 25, 2023, the entire contents of which are incorporated herein by reference.

TECHNICAL FIELD

The present disclosure relates to the technical fields of nano porous materials and functional fibers, and in particular to a super-tough cellulose aerogel fiber as well as a preparation method and use thereof.

BACKGROUND

Aerogel is a material having a three-dimensional porous network structure, which is a porous material formed by forming a disordered and continuous colloid network in a solution by a sol-gel process and then drying the colloid network. The aerogel has wide application prospects in multiple fields due to its unique pore structure and surface chemical property. Compared with other porous materials, the aerogel material has more uniform pore size and distribution, larger surface area and higher porosity. At the same time, the aerogel material has extremely low density and heat conductivity. The preparation process of the aerogel material often needs to use supercritical drying or freeze drying etc, so as to maintain the shape and the network structure of the gel by converting a liquid in wet gel into a gas. At present, the aerogel material has developed from traditional inorganic aerogel into organic aerogel, and the construction unit of the skeleton structure of the aerogel material also expands from the traditional nano particle to a one-dimensional nanofiber and a two-dimensional nano slice, etc., thereby greatly expanding the application fields and functions of the aerogel material. The aerogel material has wide application prospects in the fields of environmental protection, energy storage and conversion, thermal insulation and heat preservation and the like. For example, in the field of environmental protection, the aerogel material can be used for water treatment and air purification, namely, the environment is purified by adsorption and catalytic decomposition of harmful substances. In the field of energy, the aerogel material can be used for preparation of batteries and supercapacitors to improve energy density and energy storage efficiency. In the fields of architecture and aviation, the aerogel material can be used for preparation of thermal insulation and heat preservation materials to improve energy utilization efficiency.

The aerogel material has received more and more attentions and researches from researchers due to its unique performances and wide application prospects. Currently, most of the aerogel researches mainly focus on blocks, films and microsphere aerogel, however, there are relatively less researches on aerogel fibers. Although the aerogel material has low density and heat conductivity as well as high porosity and specific area, and other unique performances, the traditional aerogel material universally has the defects such as poor mechanical property, easy fragility and low toughness. These defects seriously restrict the development of the aerogel material in practical application. Since the aerogel has low skeleton strength and exhibits a porous network structure, it is challenging to prepare the aerogel into a fiber and endow the fiber with the characteristics of slimness and flexibility.

At present, under the researcher's strives, the preparation and application of the aerogel fiber are developed to a certain extent. Aerogel fibers based on celluloses (CN105970325A), aramid (CN115073803A), graphene (CN113215828A) and other materials are developed successively. The existing aerogel fiber preparation method is mainly to prepare a nano material dispersion solution of a corresponding material first, such as an aramid nanofiber dispersion solution, a graphene dispersion solution, a cellulose nanocrystal dispersion solution, and then spinning with the nano material dispersion solution as a spinning solution to obtain a gel fiber, followed by drying, so as to obtain the aerogel fiber. Although aerogel fibers made of different materials can be prepared by using this method, the connection between nano materials is often achieved by hydrogen bonding force or simple physical coupling, leading to the fragile connection between nano materials inside the fiber. Therefore, the obtained aerogel fiber mainly exhibits the characteristics of a rigid material, which is prone to damage and break in practical application and therefore is difficultly applied in the field of textiles. As an example, the invention patent with a patent publication number of CN105970325A provides a continuous cellulose aerogel fiber and a preparation method thereof. This method is as follows: dispersing cellulose into a dispersing agent formed after NaOH and thiourea are dissolved into water, so as to form a cellulose nanocrystal spinning solution and then spinning and drying to obtain an aerogel fiber. As another example, Chinese invention patents CN105970326A and CN106012107A differ from patent CN105970325A in that for the former, a solid cellulose aerogel fiber is transformed into a hollow cellulose aerogel fiber; for the later, the cellulose aerogel fiber is carbonized at a high temperature. Obviously, although the cellulose aerogel fiber can be obtained by the existing technology, there is a weak hydrogen bond strength between cellulose nanocrystals, which cannot make the cellulose aerogel fiber have strong strength and toughness.

To sum up, although the current aerogel fiber preparation is significantly developed, high-strength good-toughness cellulose aerogel fiber has not yet been developed, which restricts the promotion of the cellulose aerogel fiber in practical application.

Therefore, it is extremely necessary to develop a high-strength super-tough cellulose aerogel fiber and a preparation method thereof.

SUMMARY

In view of this, in order to solve the above problem, the present disclosure provides a super-tough cellulose aerogel fiber as well as a preparation method and use thereof, aiming to solve the problems existing in the prior art, such as poor aerogel fiber mechanical property, poor toughness, difficult solvent recycle and high cost, and further explore the practical scope of the aerogel fiber.

To achieve the above objective, the present disclosure provides a super-tough cellulose aerogel fiber and a method for its preparation, the method includes: employing a wet spinning technique; preparing a molecular-level celluose solution using a celluose polymer a the raw material; performing in-situ self-assembling and a hydrogen bond cross-linking reaction in the process of spinning based on the molecular-level cellulose solution as a spinning solution to form a multi-level nanofiber structure; where the nanofiber structure is a continuous three-dimensional multi-level pore network structure; when being stretched by an external force, the pore structure in the three-dimensional multi-level pore network structure becomes smaller, and the degree of orientation of the three-dimensional multi-level pore network structure in a length direction gradually increases with the proceeding of stretching, so that the strengths of link points between nanofibers constitute the strength of a fiber body to form the cellulose gel fiber with super toughness.

Where, the molecular-level cellulose solution is a cellulose polymer solution.

Preferably, the toughness of the cellulose aerogel fiber is no less than 5 MJ/m$^3$.

Based on the technical problems existing in the prior art, the cellulose aerogel fiber provided in the present disclosure is a high-strength high-toughness aerogel fiber constructed by a cellulose polymer in-situ self-assembling and hydrogen bond cross-linking integrated method. This technology adopts the molecular-level cellulose solution as the spinning solution, the cellulose polymer is subjected to in-situ self-assembling and hydrogen bond cross-linking during the spinning to form a continuous three-dimensional network structure; the three-dimensional network structure is an uniform nanofiber network structure with multi-level pores and has no obvious network defects, the strengths of many link points between fibers when being stretched by the external force constitute the strength of the fiber body, and therefore the whole network slips and is damaged after being deformed to its limit, so that the network has the characteristic of super toughness, and the toughness of the aerogel fiber is improved in order of magnitude compared with that of the aerogel fiber obtained by assembling the simple nano structure.

The present disclosure has the beneficial effects:

1. In the technical solution of the present disclosure, the super-tough cellulose aerogel fiber is obtained by using a technology for preparing a high-strength high-toughness aerogel fiber constructed by an in-situ self-assembling and hydrogen bond cross-linking integration method of a cellulose polymer, which has the characteristics of high strength, super toughness, low heat conductivity, high porosity, continuous spinnability, good flexibility, strong weavability and excellent skeleton structure stability.

2. The cellulose aerogel fiber obtained by using the technical solution of the present disclosure has not only excellent physical properties but also good adsorption and thermal insulation performance due to its multi-level pore structure, and therefore the obtained cellulose aerogel fiber not only can be applied to the technical fields of weaving, but also can be applied to the technical fields of air purification, heavy metal adsorption, atmospheric inhalable particulate matter adsorption, indoor harmful gas adsorption, filter materials or thermal insulation and heat preservation materials, and is widely applied.

3. The technical solution of the present disclosure is adopted, a cellulose molecule combined with a wet spinning technique is utilized, the raw material source is wide and available, the used raw materials are not limited to skimmed cotton, the super-tough cellulose aerogel fiber can also be obtained by directly using the cellulose and other cellulose-rich materials, with low price and high economic benefits, especially, the used solvent can be almost 100% recycled, thereby greatly reducing the cost of raw materials; furthermore, the process is the existing technology, industrialization can be achieved on the basis of the existing processing equipment without initial equipment investment, thus the process has industrialization conditions.

4. By using the technical solution of the present disclosure, the super-tough cellulose aerogel fiber is simple in preparation process, mild in reaction condition, low in energy consumption, low in cost and environmental-friendly, and can be continuously prepared and suitable for industrialization as well as large-scale production and promotion.

5. By using the technical solution of the present disclosure, the ionic liquid is used as the solvent, which can be almost 100% recycled after production, and the whole process does not involve in organic solvents that are extremely harmful to ecological environments and human health. In addition, the dissolution process is relatively quick, and the cellulose is wide in source and low in price, thereby significantly shortening preparation cycles and reducing production cost.

DETAILED DESCRIPTION OF THE EMBODIMENTS

Figure 1:
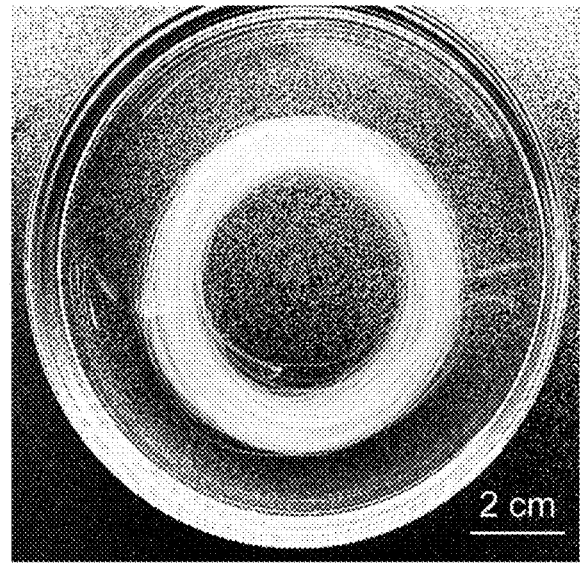
FIG. 1 is an optical photograph of a cellulose gel fiber prepared in example 1 according to the present disclosure.

To make the purpose, technical solution and advantages of the present application more clear, the technical solutions in the embodiments of the present application will be clearly and completely described in combination with the drawings in the embodiments of the present application, obviously, the described embodiments are some embodiments of the present application, but not all the embodiments.

The present disclosure provides a super-tough cellulose aerogel fiber. A molecular-level cellulose solution is used as a spinning solution, when the molecular-level cellulose solution enters a coagulating bath, an ionic liquid can be diffused into the coagulating bath, in such the way, a free cellulose molecule chain is subjected to in-situ self-assembling. Meanwhile, there are a large amount of hydroxyl groups on the cellulose molecule chain, so a hydrogen bond cross-linking reaction can be generated. The cellulose polymer forms a nano structure with multi-level pores under the dual actions of in-situ self-assembling and hydrogen bond cross-linking reaction.

The nanofiber structure is a continuous three-dimensional multi-level pore network structure; when being stretched by an external force, the pore structure in the three-dimensional multi-level pore network structure become smaller, the degree of orientation of the three-dimensional multi-level pore network structure in a length direction gradually increases with the stretching, so that the strengths of the link points between nanofibers constitute the strength of the fiber body, forming the cellulose gel fiber with super toughness.

Where, the molecular-level cellulose solution is a cellulose polymer solution.

In some specific embodiments, the three-dimensional multi-level pore network structure includes micropores with a pore size of less than 2 nm, mesopores with a pore size of 2-50 nm and macropores with a pore size of 50-100 nm.

In some specific embodiments, the toughness of the super-tough cellulose aerogel fiber is no less than 5 MJ/m$^3$.

In some more specific embodiments, the toughness of the super-tough cellulose aerogel fiber is 5-25 MJ/m$^3$.

In some specific embodiments, the super-tough cellulose aerogel fiber has a diameter of 0.1 μm-1 mm, a specific area of 290-372 m$^2$/g, a porosity of 80-90%, and a density of 0.18-0.25 g/cm$^3$.

Compared with the traditional inorganic, organic and composite aerogel fibers, the super-tough cellulose aerogel fiber of the present disclosure has a multi-level nanofiber structure obtained by in-situ self-assembling and hydrogen bond cross-linking reaction of the cellulose molecule and then orientation treatment; specifically, the super-tough cellulose aerogel fiber of the present disclosure has the maximum tensile strength of 17-30 MPa and the elongation at break of 82-110%.

In another aspect, the present disclosure also provides a preparation method of the above super-tough cellulose aerogel fiber. In the preparation method, the cellulose polymer solution is used as the spinning solution, the in-situ self-assembling and hydrogen bond cross-linking reaction are performed via a wet spinning technique, and then the cellulose aerogel fiber is obtained by solvent replacement and drying treatment on the basis of obtaining the cellulose gel fiber. In the method, the in-situ self-assembling and hydrogen bond cross-linking reaction can be conducted.

In some preferred embodiments, the preparation method of the super-tough cellulose aerogel fiber specifically includes the steps:

(1) dissolving a cellulose polymer into a solvent to obtain a cellulose molecule solution;

(2) allowing the cellulose polymer in the cellulose molecule solution to undergo in-situ self-assembling and hydrogen bond cross-linking reaction by a wet spinning technique and simultaneously combining orientation treatment to obtain a cellulose gel fiber; and (3) performing solvent replacement and drying treatment on the cellulose gel fiber to obtain a super-tough cellulose aerogel fiber.

In some preferred embodiments, the source of the cellulose polymer includes any one, or a combination of two or more of poly cellulose, lignin fiber, cellulose ether, methylcellulose, hydroxypropylmethyl cellulose, hydroxyethyl cellulose, carboxymethyl cellulose, and natural plant materials such as cotton, linen, wooden materials, straw, husks and bamboo.

In some preferred embodiments, the solvent includes but is not limited to an ionic liquid, or a mixture of any one or two or more of dimethylsulfoxide (DMSO), N-methylpyrrolidone (NMP), dimethylacetamide (DMAC) and deionized water with the ionic liquid.

In some more preferred embodiments, the ionic liquid includes but is not limited to a liquid totally consisting of ions, including an imidazole type ionic liquid, a pyridine type ionic liquid and a quaternary ammonium salt type ionic liquid.

In some preferred embodiments, when the ionic liquid is used in combination with other reagents, a mass ratio of the ionic liquid to the other reagents is 1:1; the other reagents include one, or a combination of two or more of DMSO, NMP, DMAC or deionized water.

In some preferred embodiments, the cellulose molecule solution consists of a cellulose polymer and an ionic liquid; where the concentration of the cellulose polymer in the cellulose molecule solution is 0.1-20 wt %, preferably 4-6 wt %.

In some preferred embodiments, the cellulose polymer has a degree of polymerization between 6000 and 11000.

In some preferred embodiments, the dissolution temperature of the cellulose polymer in the solvent is 50-100° C., preferably 70-80° C.

In some preferred embodiments, the dissolution time of the cellulose polymer in the solvent is 0.3-96 h, preferably 72 h. The dissolution time depends on the content of celluloses in the polymer solution. The less cellulose content means the shorter dissolution time.

In some preferred embodiments, the wet spinning technique is achieved by a method of adding the coagulating bath, specifically, the coagulating rate is regulated with or without the addition of a good solvent or a poor solvent on the basis of water, absolute ethyl alcohol and a mixed solution of the water and the absolute ethyl alcohol in any ratio.

In some preferred embodiments, the wet spinning technique includes providing a cellulose molecule solution having a selected concentration as the spinning solution and absolute ethyl alcohol as the coagulating bath, extruding the spinning solution through an injection pump so that the spinning solution flows into the coagulating bath, the cellulose polymer in the cellulose molecule solution is subjected to in-situ self-assembling and hydrogen bond crosslinking reaction, and then performing orientation treatment, so as to obtain the cellulose gel fiber.

Further, the process conditions adopted by the wet spinning technique include: the concentration of the cellulose molecule solution is 0.1-20 wt %, the diameter of an extrusion needle head is 0.1 μm-1 cm, and the range of the extrusion speed is 0.1-1000 mL/min.

In some preferred embodiments, the orientation method adopted by the wet spinning technique includes any one, or a combination of two or more of flow orientation, stretching orientation and directional freezing orientation.

In some preferred embodiments, the solvent replacement in the preparation method includes replacing the solvent that is not easily dried in the cellulose gel fiber with an easily dried solvent, and then drying the replaced cellulose gel fiber to obtain the cellulose aerogel fiber.

In some preferred embodiments, the easily dried solvent includes any one, or a combination of two or more of water, methanol, ethanol, tert-butanol, acetone, cyclohexane, and n-hexane, but is not limited thereto.

In some preferred embodiments, the drying treatment includes any one, or a combination of two or more of a supercritical fluid drying method, a vacuum freeze-drying method and a vacuum drying method.

Through the above technical solution, the preparation method provided by the present disclosure makes the cellulose aerogel fiber have a relatively high degree of orientation through orientation treatment, thereby obtaining large mechanical strength and super-high toughness. The aerogel fiber combines the light weight and mesoporous features of aerogel with the flexibility and slimness features of the fiber, and therefore can be more widely applied in the fields of smart fabrics, wearability and the like. Compared with inorganic, organic and composite aerogel fibers that have been reported, the preparation method of the super-tough cellulose aerogel fiber provided by the present disclosure has two obvious advantages: first, the ionic liquid is used as the solvent in this method, which can be almost 100% recycled after production, and the whole process does not involve in organic solvents that pose significant harm to ecological environment and human health. This is because the ionic liquid is almost not evaporated, even the ionic liquid is mixed with other solvents, the ionic liquid can be almost about 100% recycled through a heating method only. In addition, the dissolution process is relatively quick and the cellulose is wide in source and low in price, greatly shortening the preparation cycle and reducing the production cost; second, the raw materials used in the method are not limited to skimmed cotton, and the super-tough cellulose aerogel fiber can also be obtained by directly using the cellulose and other cellulose-rich materials.

Based on the cellulose aerogel fiber provided in the above technical solution, another aspect of the present disclosure also provides use of the above super-tough aerogel fiber in the fields of textile preparation, composite preparation, air purification, heavy metal adsorption, atmospheric inhalable particulate matter adsorption, indoor harmful gas adsorption, filtration materials or thermal insulation and heat preservation materials, and the like.

Next, the technical solution of the present disclosure will be further described in detail through specific embodiments.

Example 1

This example provides a preparation method of a super-tough cellulose aerogel fiber, specifically including the steps:

(1) preparation of spinning solution: a cellulose (degreased cotton) was dissolved with an ionic liquid (1-allyl-3-methylimidazolium chloride) at 80° C., and the above mixed solution was heated and slowly stirred for 72 h to prepare a cellulose molecule solution with a concentration of 5 wt %; the degree of polymerization of the cellulose polymer was about 9000;

(2) wet spinning: the 5 wt % cellulose molecule solution was subjected to orientation treatment (flow orientation) by a wet spinning method to obtain a cellulose gel fiber. Specifically, the cellulose molecule solution flew through a conduit and a spinning needle head (a diameter of 300 μm) at the extrusion speed of 300 μL/min and then entered an absolute ethyl alcohol coagulating bath, so as to initially obtain a cellulose gel fiber, and finally the cellulose gel fiber was obtained via orientation treatment (flow orientation);

(3) preparation of super-tough cellulose aerogel fiber: the cellulose gel fiber obtained in step (2) was subjected to solvent replacement (the used easily dry solvent was absolute ethyl alcohol) followed by freeze drying to obtain the super-tough cellulose aerogel fiber.

The specific physical properties of the super-tough cellulose aerogel fiber are seen in Table 1.

Figure 2:
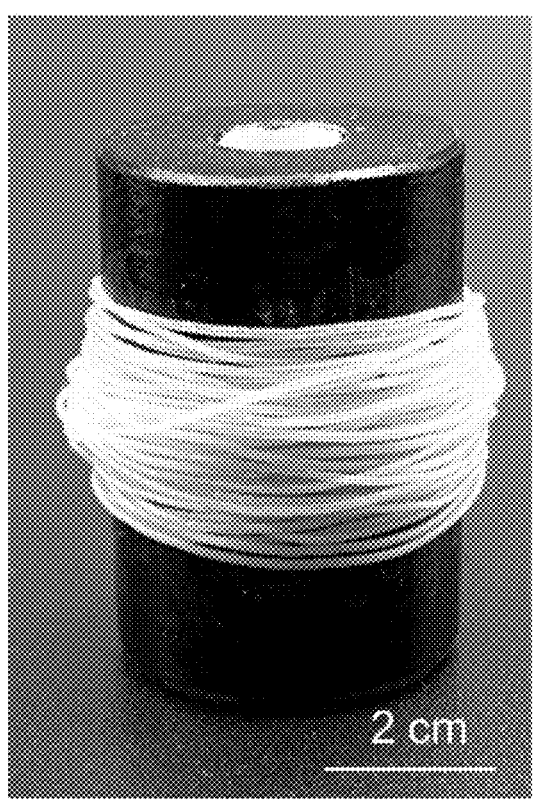
FIG. 2 is an optical photograph of a cellulose aerogel fiber prepared in example 1 according to the present disclosure.

FIG. 1 and FIG. 2 are optical pictures of a cellulose gel fiber and a super-tough cellulose aerogel fiber obtained in the above steps in this example, respectively. It can be seen from the figures that the super-tough cellulose aerogel fiber prepared in this example is uniform in appearance, or, the aerogel fiber prepared by the method provided in this example is uniform in thickness, and has the potential of batch preparation and production.

Figure 3:
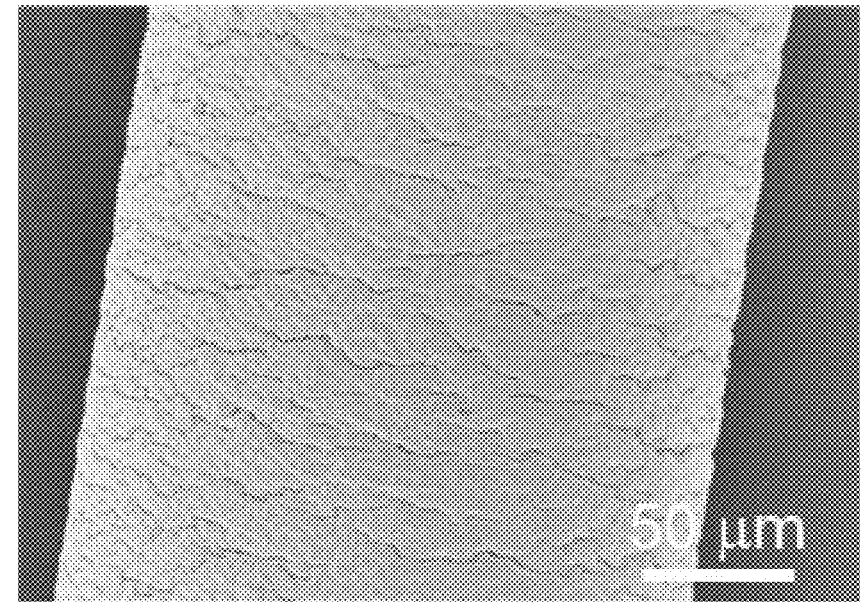
FIG. 3 is a surface scanning electron micrograph of a cellulose aerogel fiber prepared in example 1 according to the present disclosure.
Figure 4A:
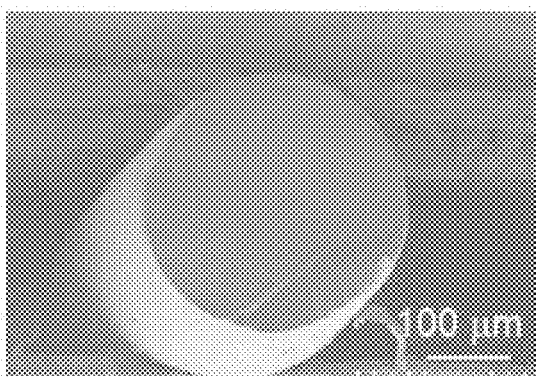
FIG. 4A and FIG. 4B are magnified scanning electron micrographs of a cross section (FIG. 4A) and a local part (FIG. 4B) of a cellulose aerogel fiber prepared in example 1 according to the present disclosure, respectively.
Figure 4B:
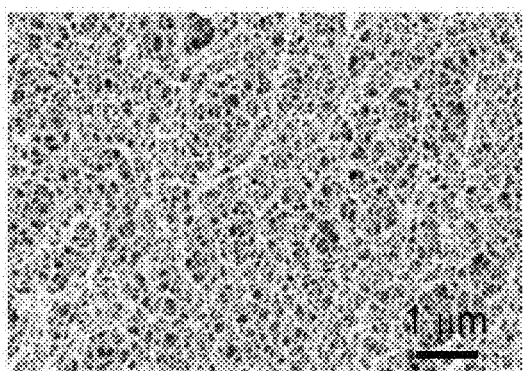

FIG. 3, FIG. 4A and FIG. 4B are scanning electron microscopy images of the surface and the cross section of the super-tough cellulose aerogel fiber prepared in this example, respectively. It can be seen from the figures that the surface of the super-tough cellulose aerogel fiber prepared in this example is uniform without cracks, and the inside of the fiber is in a continuous three-dimensional multi-level pore network structure.

Figure 5A:
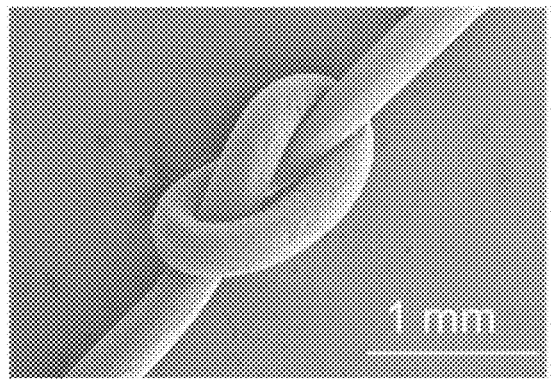
FIG. 5A and FIG. 5B are magnified scanning electron micrographs of a surface (FIG. 5A) and a local part (FIG. 5B) of a cellulose aerogel fiber prepared in example 1 according to the present disclosure after knotting, respectively.
Figure 5B:
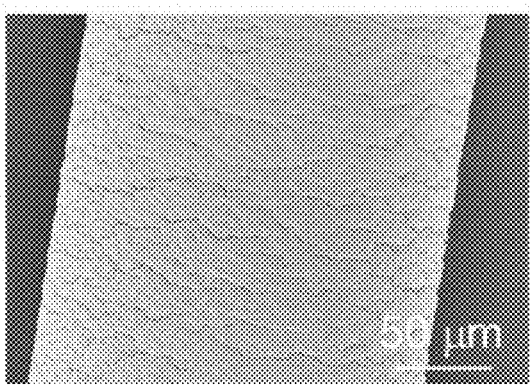

FIG. 5A and FIG. 5B are magnified scanning electron microscopy images of a surface and a local part of a super-tough cellulose aerogel fiber prepared in this example after knotting, respectively. It can be seen from the figures that the super-tough cellulose aerogel fiber prepared in this example has good flexibility, is not cracked after knotting and can be practically applied in the field of weaving.

Figure 6:
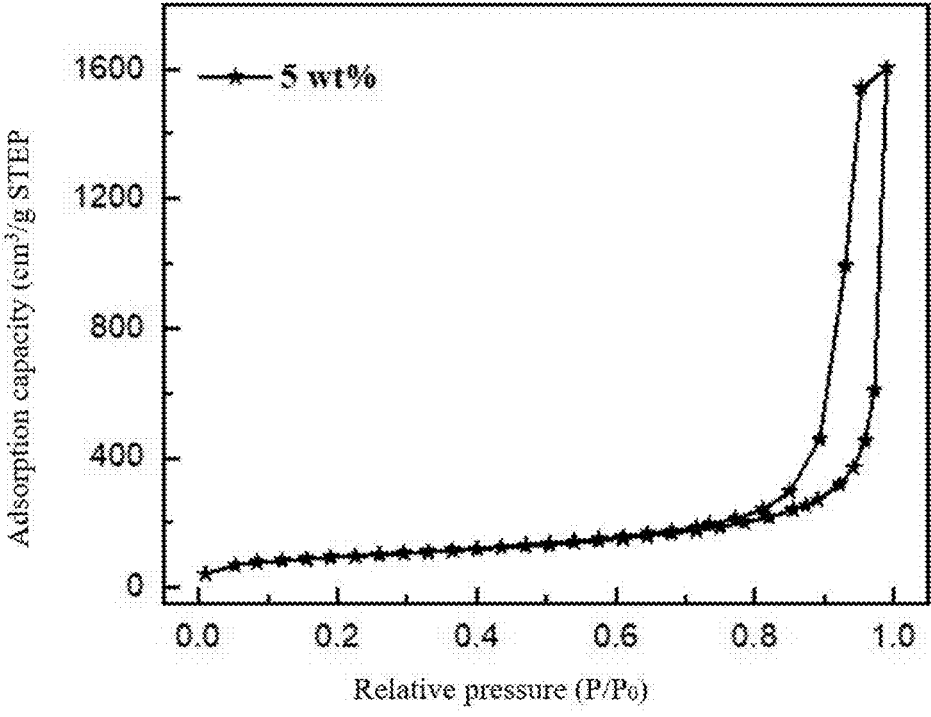
FIG. 6 is a nitrogen adsorption and desorption curve graph of a cellulose aerogel fiber prepared in example 1 according to the present disclosure.
Figure 7:
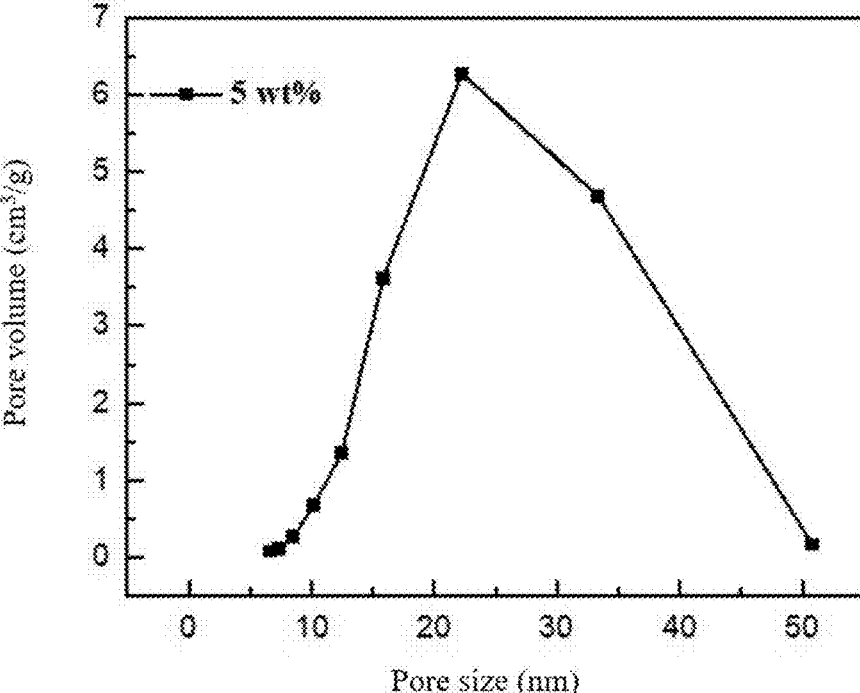
FIG. 7 is a pore size distribution graph of a cellulose aerogel fiber prepared in example 1 according to the present disclosure.

FIG. 6 and FIG. 7 are nitrogen adsorption and desorption curve and pore side distribution graphs of a super-tough cellulose fiber aerogel fiber prepared in this example, respectively. It can be seen from FIG. 6 that the curve has an obvious hysteresis loop, which is a typical IV type adsorption and desorption isotherm, indicating that the cellulose aerogel fiber has a three-dimensional multi-level pore network structure consisting of typical mesoporous structures, including micropores with a pore size of less than 2 nm, mesopores with a pore size of 2-50 nm and macropores with a pore size of 50 nm-100 nm. Due to the multi-level pore network structure, the cellulose aerogel fiber has excellent adsorption capability.

It can be seen from FIG. 7 that there is a wide pore size distribution in a mesopore size range of more than 10 nm, mainly focusing on 15-30 nm.

Figure 8:
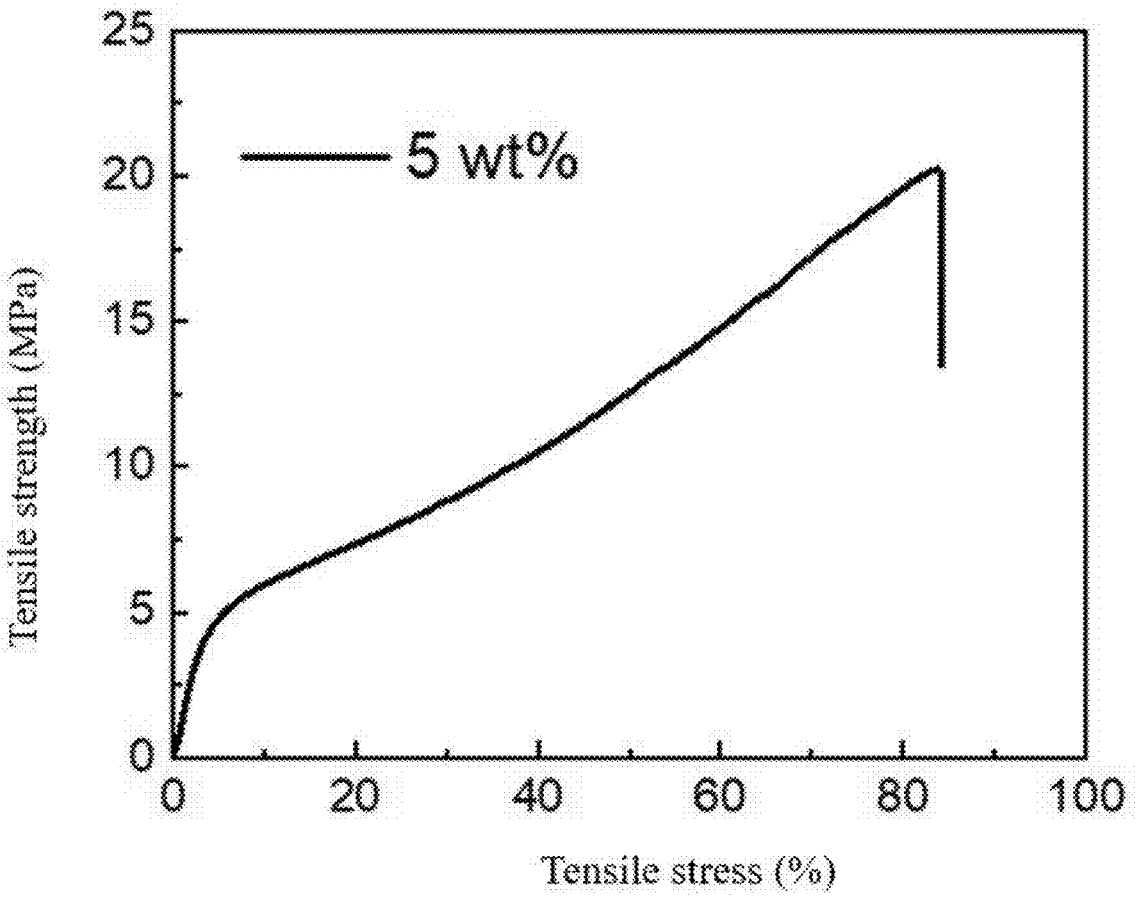
FIG. 8 is a tensile stress-strain curve graph of a cellulose aerogel fiber prepared in example 1 according to the present disclosure.

FIG. 8 is a tensile stress-strain curve of a super-tough cellulose aerogel fiber prepared in this example. It can be seen from the figure that the tensile strength of the super-tough aerogel fiber prepared in this example increases with the increase in tensile strain. The super-tough aerogel fiber prepared in this example has tensile strength of up to 20 MPa and fracture tensile strain of up to 84%.

Figure 9:
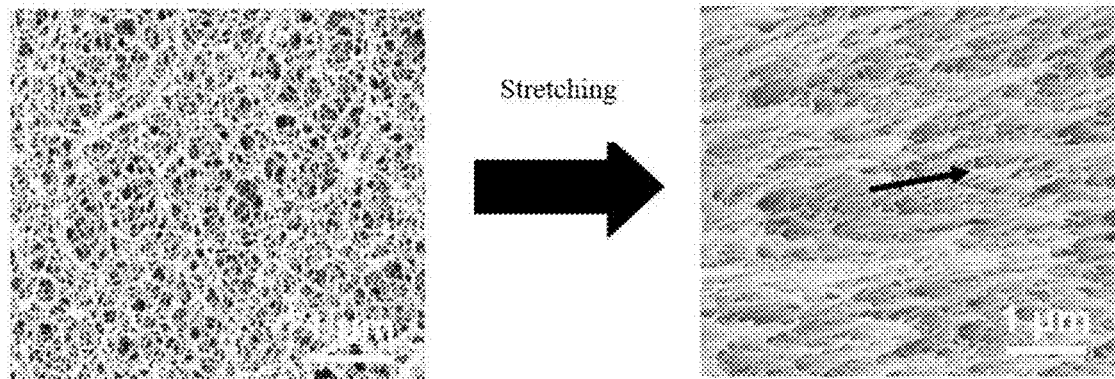
FIG. 9 is a cross-sectional scanning electron micrograph of a cellulose aerogel fiber prepared in example 1 according to the present disclosure before stretching and after fracture.

FIG. 9 is a cross-sectional scanning electron microscopy image of a super-tough cellulose aerogel fiber prepared in this example before and after stretching. It can be seen from the figure that in the process of extending the super-tough cellulose aerogel fiber prepared in this example due to external force stretching, the macropores gradually become smaller, and the degree of orientation of the fiber in the length direction gradually increases. Specifically, the pore structure in the three-dimensional multi-level pore network structure becomes smaller, and the degree of orientation of the pore fiber in the length direction gradually increases with the stretching, so that the strengths of the link points between nanofibers constitute the strength of the fiber body. Based on this, the cellulose aerogel fiber provided in this example has super toughness, that is, with the external force stretching, the degree of orientation of the pore fiber changes so that the orientations of the link points of the nanofiber tend to be consistent to form the strength of the fiber body. The orientation direction is represented by an arrow in the figure.

Figure 10:
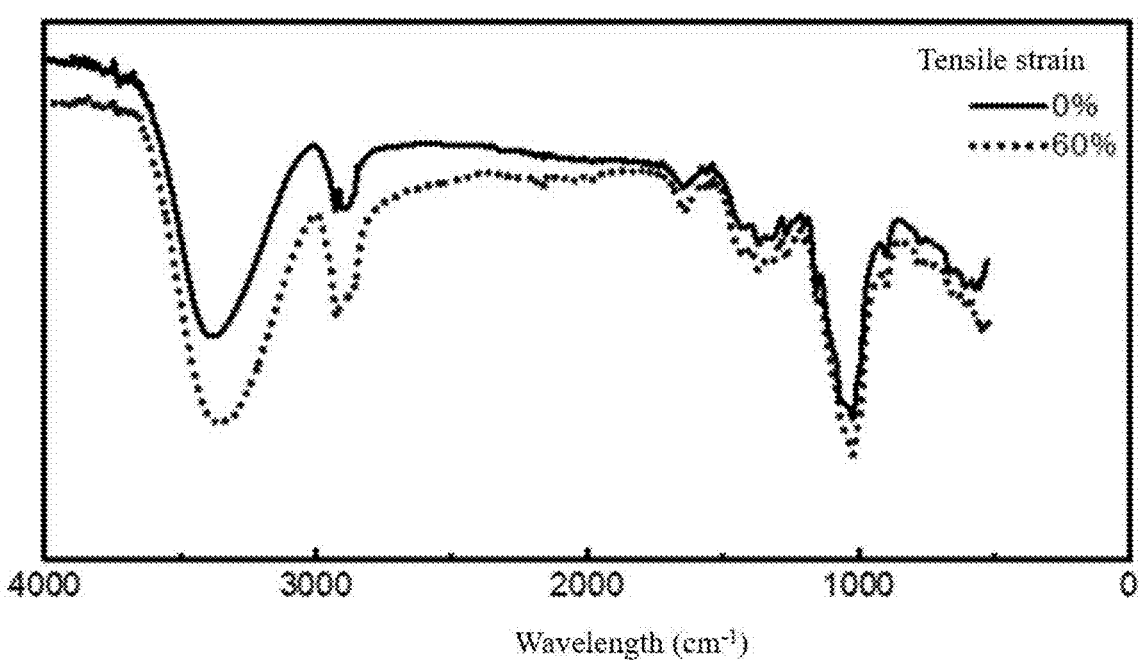
FIG. 10 is an infrared spectrum of a cellulose aerogel fiber prepared in example 1 according to the present disclosure before and after stretching.

FIG. 10 is an infrared spectrum of a super-tough cellulose aerogel fiber prepared in this example before and after stretching. It can be seen from the figure that after the super-tough cellulose aerogel fiber prepared in this example is stretched, the number of formed hydrogen bonds increase, and the O—H bond undergoes a blue shift phenomenon.

Figure 11:
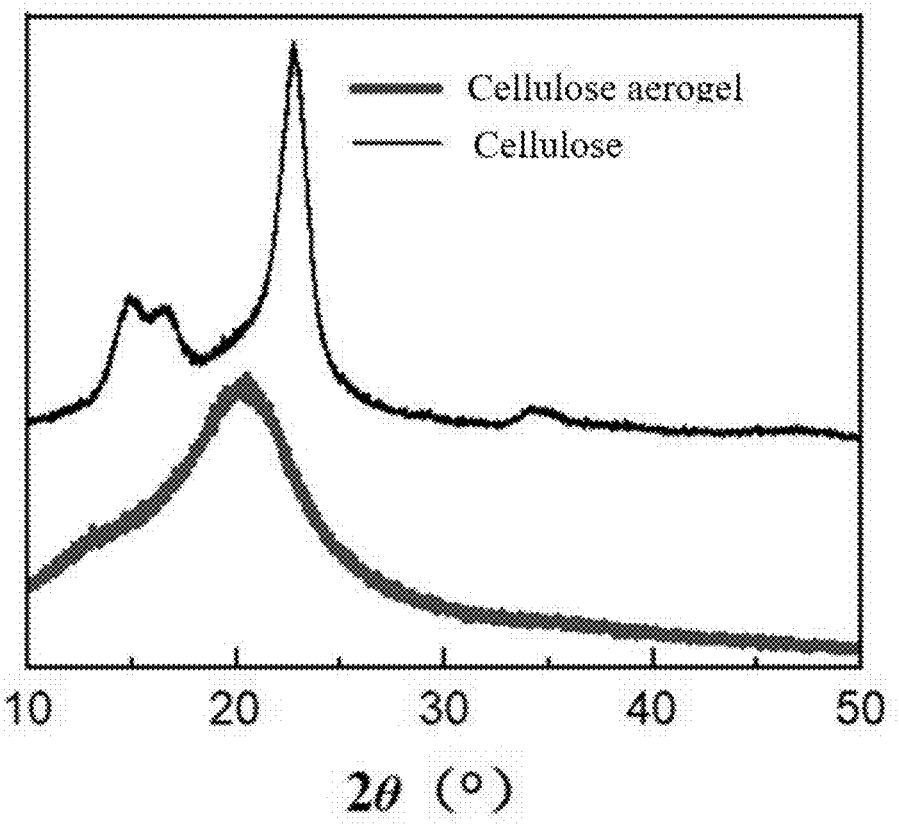
FIG. 11 is an X-ray diffraction (XRD) image of a cellulose aerogel fiber and cellulose prepared in example 1 according to the present disclosure.

FIG. 11 is an XRD spectrum of a super-tough cellulose aerogel fiber and cellulose prepared in this example. It can be seen from the spectrum that after dissolution into the ionic liquid and regeneration in the solvent, the diffraction peak of the cellulose significantly changes. The main peaks of the cellulose before dissolution are distributed at 15.05°, 16.76° and 22.76° which correspond to (101), (101) and (002) crystal planes of a cellulose I crystal form, so the cellulose of raw material absorbent cotton is mainly present in a form of cellulose I crystal; the main peak in the regenerated cellulose aerogel fiber is located at 20.45° which corresponds to the (200) crystal plane of a regenerated cellulose II crystal form, indicating that the cellulose is transformed from the native cellulose I crystal form into the regenerated cellulose II crystal form.

Figure 12:
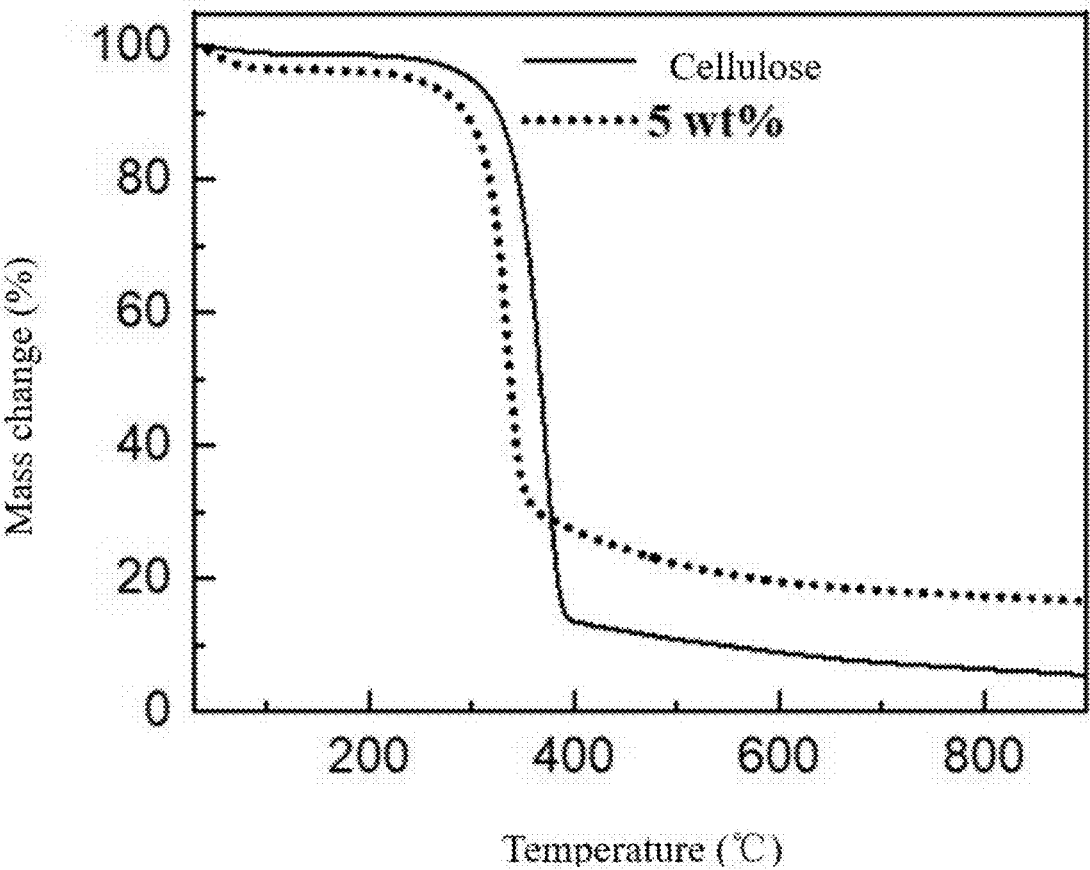
FIG. 12 is a thermogravimetry (TG) curve graph of a cellulose aerogel fiber and cellulose prepared in example 1 according to the present disclosure.

FIG. 12 is a TG curve graph of a super-tough cellulose aerogel fiber and cellulose prepared in this example. It can be seen from the figure that compared with the raw material before dissolution, the decomposition temperature of the cellulose aerogel fiber is slightly reduced, the thermal stability of the cellulose aerogel fiber slightly decreases, but the residual mass is higher than that of the native fiber, this is possibly because in the process of preparing the cellulose aerogel fiber, the cellulose is transformed from an I type crystal into an II type crystal, and the configuration of the cellulose II type crystal is more prone to conformational reversal compared to the cellulose I type crystal, making it more prone to dehydration and decarboxylation to form residues so as to result in a higher residual carbon content.

Figure 13:
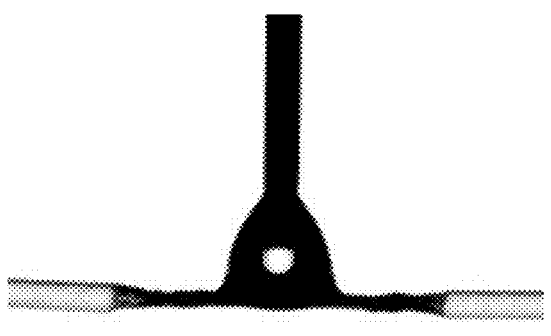
FIG. 13 is a contact angle picture of a cellulose aerogel fiber prepared in example 1 according to the present disclosure before hydrophobization.

FIG. 13 is a contact angle picture of a super-tough cellulose aerogel fiber prepared in this example before hydrophobization. It can be seen from the figure that the super-tough cellulose aerogel fiber has good hydrophilicity, and the three-dimensional network structure after water absorption is more prone to collapse.

Figures 14, 15:
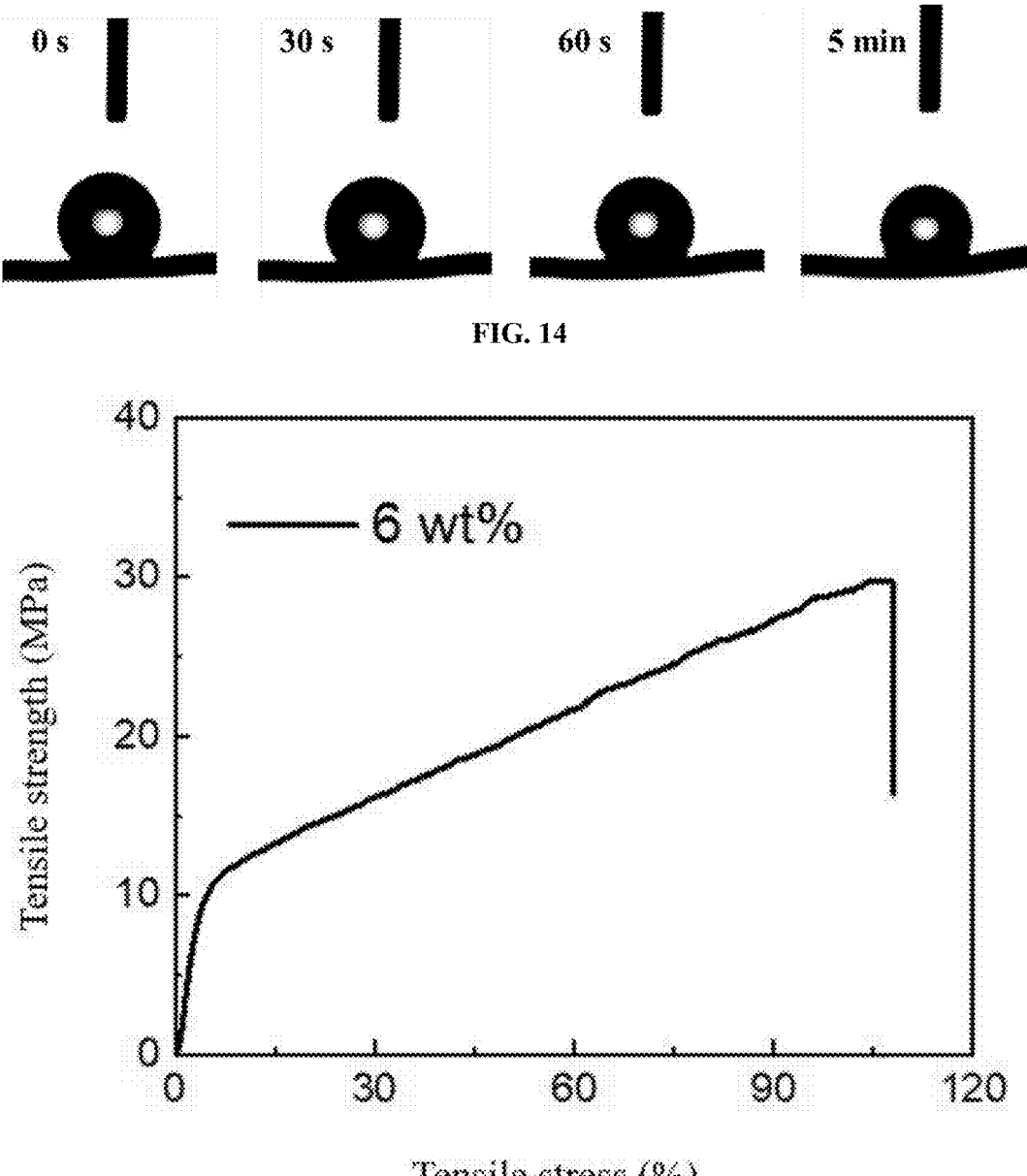
FIG. 14 is a contact angle picture of a cellulose aerogel fiber prepared in example 1 according to the present disclosure at different times after hydrophobization.
FIG. 15 is a tensile stress-strain curve graph of a cellulose aerogel fiber prepared in example 6 according to the present disclosure.

FIG. 14 shows the changes of indirect antennae at different times after hydrophobic hydrolysis of the super-tough cellulose aerogel fiber prepared in this embodiment. It can be seen from the figure that the cellulose aerogel fiber has excellent hydrophobic property after hydrophobization treatment. The hydrophobic modification method is as follows: methyltrimethoxysilane was used as a cold plasma gas source. In a plasma device, a dry cellulose aerogel was placed in a cold plasma room, and treated under a glow discharge system. When a vacuum degree reached a constant value (a set value in the experiment was 200 Pa±50 Pa), a discharge system was started. Under the special power (150 W in the experiment) and time (3-10 min in the experiment), a hydrophobic cellulose aerogel fiber was finally obtained.

Example 2

This example provides a preparation method of a super-tough cellulose aerogel fiber, specifically including the steps:

(1) preparation of spinning solution: a cellulose (degreased cotton) was dissolved with an ionic liquid (1-allyl-3-methylimidazolium chloride) at 80° C., and the above mixed solution was heated and slowly stirred for 48 h to prepare a cellulose molecule solution with a concentration of 4 wt %; the cellulose molecule solution was a cellulose polymer solution, and the degree of polymerization of the cellulose polymer was about 9500;

(2) wet spinning: the 4 wt % cellulose molecule solution was subjected to orientation treatment (flow orientation) by a wet spinning method to obtain a cellulose gel fiber. Specifically, the cellulose molecule solution flew through a conduit and a spinning needle head (a diameter of 300 μm) at the extrusion speed of 300 μL/min and then entered an absolute ethyl alcohol coagulating bath, so as to initially obtain a cellulose gel fiber, and finally the cellulose gel fiber was obtained via orientation treatment;

(3) preparation of super-tough cellulose aerogel fiber: the cellulose gel fiber obtained in step (2) was subjected to solvent replacement (the used easily dried solvent was absolute ethyl alcohol) followed by freeze drying to obtain the super-tough cellulose aerogel fiber.

By the above steps, the specific properties of the super-tough cellulose aerogel fiber prepared in this example are seen in Table 1.

Example 3

This example provides a preparation method of a super-tough cellulose aerogel fiber, specifically including the steps:

(1) preparation of spinning solution: a cellulose (degreased cotton) was dissolved with an ionic liquid (1-allyl-3-methylimidazolium chloride) at 80° C., and the above mixed solution was heated and slowly stirred for 96 h to prepare a cellulose molecule solution with a concentration of 6 wt %; the degree of polymerization of the cellulose polymer was about 9000;

(2) wet spinning: the 6 wt % cellulose molecule solution was subjected to orientation treatment (flow orientation) by a wet spinning method to obtain a cellulose gel fiber. Specifically, the cellulose molecule solution flew through a conduit and a spinning needle head (a diameter of 300 µm) at the extrusion speed of 300 µL/min and then entered an absolute ethyl alcohol coagulating bath, so as to initially obtain a cellulose gel fiber, and finally the cellulose gel fiber was obtained via orientation treatment.

(3) preparation of super-tough cellulose aerogel fiber: the cellulose gel fiber obtained in step (2) was subjected to solvent replacement (the used easily dried solvent was absolute ethyl alcohol) followed by freeze drying to obtain the super-tough cellulose aerogel fiber.

By the above steps, the stress-strain curve of the super-tough cellulose aerogel fiber prepared in this example is as shown in FIG. 15. Specific properties are seen in Table 1.

Example 4

This example provides a preparation method of a super-tough cellulose aerogel fiber, specifically including the steps:

(1) preparation of spinning solution: a cellulose (degreased cotton) was dissolved with a mixed liquid (a mass ratio was 1:1) of ionic liquid (1-allyl-3-methylimidazolium chloride) and DMSO at 80° C., and the above mixed solution was heated and slowly stirred for 72 h to prepare a cellulose molecule solution with a concentration of 5 wt %; the degree of polymerization of the cellulose polymer was about 7000;

(2) wet spinning: the 5 wt % cellulose molecule solution was subjected to orientation treatment (flow orientation) by a wet spinning method to obtain a cellulose gel fiber. Specifically, the cellulose molecule solution flew through a conduit and a spinning needle head (a diameter of 300 µm) at the extrusion speed of 300 µL/min and then entered an absolute ethyl alcohol coagulating bath, so as to initially obtain a cellulose gel fiber, and finally the cellulose gel fiber was obtained via orientation treatment.

(3) preparation of super-tough cellulose aerogel fiber: the cellulose gel fiber obtained in step (2) was subjected to solvent replacement (the used easily dried solvent was absolute ethyl alcohol) followed by freeze drying to obtain the super-tough cellulose aerogel fiber.

By the above steps, the specific properties of the super-tough cellulose aerogel fiber prepared in this example are seen in Table 1.

Example 5

This example differs from example 1 in that: step 1 includes preparation of a spinning solution: a cellulose (degreased cotton) was dissolved with an ionic liquid (1-allyl-3-methylimidazolium chloride) at 80° C., and the above mixed solution was heated and slowly stirred for 20 h to prepare a cellulose molecule solution with a concentration of 5 wt %; the degree of polymerization of the cellulose polymer was about 9000.

Example 6

This example differs from example 1 in that: step 1 includes preparation of a spinning solution: a cellulose (degreased cotton) was dissolved with an ionic liquid (1-allyl-3-methylimidazolium chloride) at 80° C., and the above mixed solution was heated and slowly stirred for 72 h to prepare a cellulose molecule solution with a concentration of 20 wt %; the degree of polymerization of the cellulose polymer was about 9300.

Example 7

This example differs from example 1 in that: step 1 includes preparation of a spinning solution: a cellulose (degreased cotton) was dissolved with an ionic liquid (1-allyl-3-methylimidazolium chloride) at 50° C., and the above mixed solution was heated and slowly stirred for 72 h to prepare a cellulose molecule solution with a concentration of 20 wt %; the degree of polymerization of the cellulose polymer was about 9200.

Example 8

The cellulose aerogel fiber prepared in example 1 was knitted into textiles in a manner of vertically and horizontally interweaving.

Figure 16:
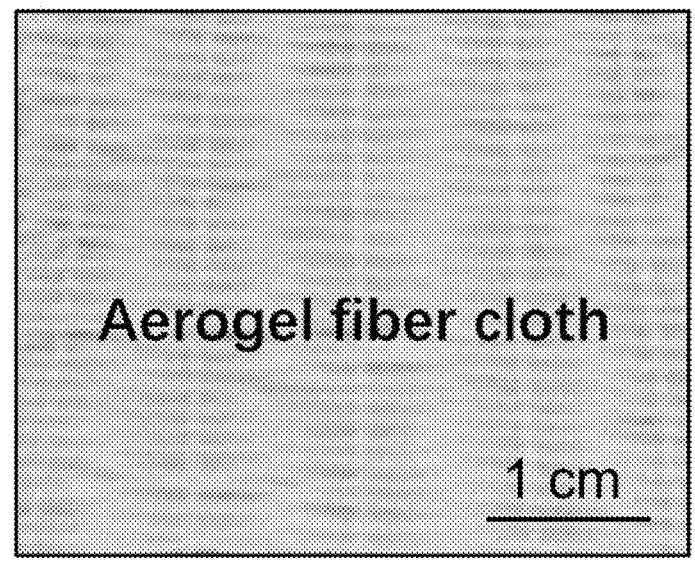
FIG. 16 is an optical picture of cloth knitted by a cellulose aerogel fiber prepared in example 1 according to the present disclosure.

As shown in FIG. 16, the knitted textiles can be applied to high-temperature thermal insulation and low-temperature heat preservation.

Example 9

The cellulose aerogel fiber prepared in example 1 was knitted into string bags in a manner of vertically and horizontally interweaving.

Figure 17:
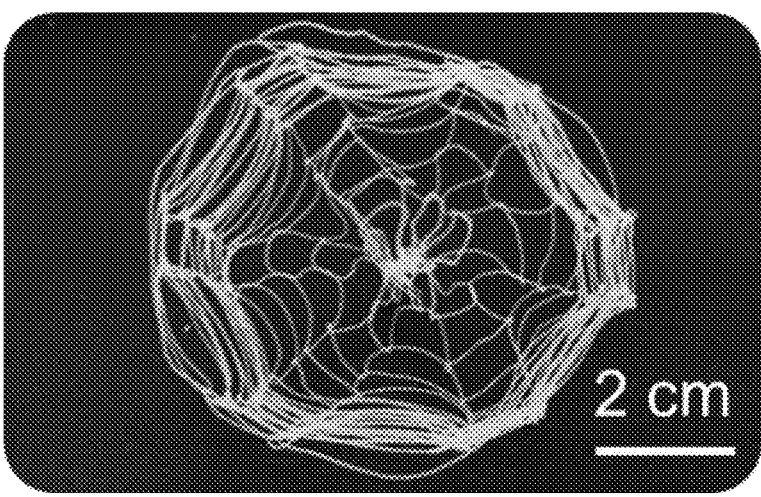
FIG. 17 is an optical picture of a string bag knitted by a cellulose aerogel fiber prepared in example 1 according to the present disclosure.

As shown in FIG. 17, the knitted string bags can be applied to object reception at high altitude.

Comparative Example 1

This comparative example provides a cellulose gel fiber prepared by using the technical solution of the present disclosure based on urea and thiourea as raw materials. The specific preparation steps are as follows:

(1) preparation of spinning solution: a cellulose was dissolved with a solution (a mass ratio was 16:16:13: 155) composed of NaOH, urea and water at 80° C., so as to prepare a cellulose spinning solution with a concentration of 5 wt %;

(2) wet spinning: the 5 wt % cellulose spinning solution was subjected to orientation treatment by a wet spinning method to obtain a cellulose gel fiber. Specifically, the cellulose molecule solution flew through a conduit and a spinning needle head (a diameter of 300 µm) at the extrusion speed of 300 µL/min and then entered an absolute ethyl alcohol coagulating bath, so as to initially obtain a cellulose gel fiber, and finally the cellulose gel fiber was obtained via orientation treatment;

(3) preparation of cellulose aerogel fiber: the cellulose gel fiber obtained in step (2) was subjected to solvent replacement (the used easily dried solvent was absolute ethyl alcohol) followed by freeze drying to obtain the cellulose aerogel fiber.

By the above steps, compared with example 1, the strength and toughness of the cellulose aerogel fiber obtained in this comparative example are far lower than those in example 1 of the present disclosure. The specific properties are seen in Table 1.

Referring to Table 1, it shows structure and physical property parameters of the cellulose aerogel fibers obtained in examples 1-7 and comparative example 1 in the present disclosure.

TABLE 1

Performance parameters of cellulose aerogel fibers
obtained in examples 1-7 and comparative example 1

| Example | Specific area $(m^2/g)$ | Po- rosity (%) | Density $(g/m^3)$ | Maximum tensile strength (MPa) | Elongation at break (%) | Tough- ness $(MJ/m^3)$ |
|---|---|---|---|---|---|---|
| Example 1 | 371.94 | 86.85 | 0.18 | 20.25 | 84.0 | 9.60 |
| Example 2 | 364.40 | 89.54 | 0.15 | 16.92 | 79.6 | 6.50 |
| Example 3 | 291.03 | 83.15 | 0.24 | 30.01 | 107.0 | 21.85 |
| Example 4 | 350.05 | 86.96 | 0.17 | 19.36 | 81.2 | 9.04 |
| Example 5 | 180.32 | 73.82 | 0.16 | 18.14 | 71.2 | 8.12 |
| Example 6 | 161.58 | 69.94 | 0.13 | 15.68 | 63.8 | 6.57 |
| Example 7 | 132.87 | 57.31 | 0.1 | 12.43 | 58.4 | 5.08 |
| Comparative example 1 | 262.64 | 87.43 | 0.17 | 8.05 | 45.4 | 1.62 |

It can be seen from Table 1 that the toughness of the cellulose aerogel fibers obtained in examples 1-7 is all more than 5 MJ/m³, with a maximum of 22 MJ/m³. Therefore, the toughness of the cellulose aerogel fibers obtained in examples 1-7 is significantly improved compared with that in the prior art.

Further, by comparing example 1 with comparative example 1, the tensile strength, elongation at break and toughness are all obviously and significantly improved, that is, the cellulose aerogel fiber constructed by using the molecular-level cellulose solution and utilizing an in-situ self-assembling and hydrogen bond cross-linking integrated technology are significantly improved in terms of physical properties.

In examples 1-7, the cellulose aerogel fibers prepared by using different cellulose molecule solutions and different coagulating rates can all achieve high strength and high toughness. Particularly, by comparing example 1 with example 3, when the concentration of the cellulose molecule solution is increased from 5 wt % to 6 wt %, the dissolution time of the cellulose is prolonged from 72 h to 96 h, and the physical properties of the cellulose are obviously improved; further, by comparing example 1 with example 4, only the ionic liquid in step 1 changes, only 1-allyl-3-methylimidazolium chloride is used in example 1, and a mixed solution of 1-allyl-3-methylimidazolium chloride and DMSO is used in example 4, their properties are relatively close, and therefore the physical properties in example 4 are slightly reduced.

In conclusion, by virtue of the above technical solution, the preparation method of the super-tough cellulose aerogel fiber provided by the present disclosure is simple in preparation process, less in preparation step, relatively short in preparation cycle, low in cost and high in economic benefits, has no harmful solvents that are difficult to recycle, and possesses industrialization conditions.

In addition, this method can be used for continuous preparation, the used solvent can be almost 100% recycled, furthermore, the raw materials are wide in source and low in price and has good industrialization prospects, the obtained super-tough aerogel fiber has the characteristics of high strength, super toughness, low heat conductivity, high poros-ity, continuous spinnability, good flexibility, strong weav-ability, excellent skeleton and the like, can be woven and applied to extreme or special environments, thereby further expanding the application range of this type of materials.

What is claimed is:

1. A super-tough cellulose aerogel fiber, wherein the super-tough cellulose aerogel fiber comprises a multi-level nanofiber structure obtained by in-situ self-assembling and hydrogen bond cross-linking reaction, and the multi-level nanofiber structure is a continuous three-dimensional multi-level pore network structure, wherein the three-dimensional multi-level pore network structure comprises pores with a pore size of less than 2 nm, mesopores with a pore size of 2-50 nm, and macropores with a pore size of 50-100 nm; wherein a toughness of the super-tough cellulose aerogel fiber is not less than 5 MJ/m³; and wherein the super-tough cellulose aerogel fiber is prepared by a wet spinning technique, comprising:

(a) dissolving a cellulose polymer into a solvent to obtain a cellulose molecule solution, wherein the solvent comprises an ionic liquid selected from the group consisting of an imidazole type ionic liquid, a pyridine type ionic liquid, and a quaternary ammonium salt type ionic liquid;

(b) allowing the cellulose polymer in the cellulose mol-ecule solution to undergo the in-situ self-assembling and the hydrogen bond cross-linking reaction by the wet spinning technique and simultaneously combining an orientation treatment to obtain a cellulose gel fiber; and (c) performing a solvent replacement and a drying treat-ment on the cellulose gel fiber to obtain the super-tough cellulose aerogel fiber; and wherein when being stretched by an external force, a pore structure in the three-dimensional multi-level pore network structure becomes smaller, a degree of an orientation of the three-dimensional multi-level pore network struc-ture in a length direction gradually increases with a proceeding of stretching.

2. The super-tough cellulose aerogel fiber according to claim 1, wherein a source of the cellulose polymer com-prises any one, or a combination of two or more of poly-polymerized cellulose, lignin fiber, cellulose ether, methyl-cellulose, hydroxypropylmethyl cellulose, hydroxyethyl cellulose, carboxymethyl cellulose, or a natural plant mate-rial;

and/or, the natural plant material comprises any one, or a combination of two or more of cotton, flax, a wood material, straw, husk, and bamboo;

and/or, the cellulose polymer has a degree of polymer-ization between 6000 and 11000.

3. The super-tough cellulose aerogel fiber according to claim 2, wherein the solvent comprises a mixture of one or more of dimethylsulfoxide (DMSO), N-methylpyrrolidone (NMP), dimethylacetamide (DMAC), and deionized water with the ionic liquid;

and/or, the ionic liquid is recycled.

4. The super-tough cellulose aerogel fiber according to claim 1, wherein the toughness of the super-tough cellulose aerogel fiber is not less than 5 MJ/m³, with a diameter of 0.1 μm-1 mm, a specific area of 290-372 m²/g, a porosity of 80-90%, and a density of 0.18-0.25 g/cm³.

5. The super-tough cellulose aerogel fiber according to claim 1, wherein the super-tough cellulose aerogel fiber has a maximum tensile strength of 17-30 MPa, an elongation at break of 82-110%, and the toughness of 5-25 MJ/m³.

6. A preparation method of the super-tough cellulose aerogel fiber according to claim 1, specifically comprising:

(1) dissolving the cellulose polymer into a solvent to obtain a cellulose molecule solution;

(2) allowing the cellulose polymer in the cellulose molecule solution to undergo the in-situ self-assembling and the hydrogen bond cross-linking reaction by the wet spinning technique and simultaneously combining an orientation treatment to obtain a cellulose gel fiber; and (3) performing a solvent replacement and a drying treatment on the cellulose gel fiber to obtain the super-tough cellulose aerogel fiber.

7. The preparation method of the super-tough cellulose aerogel fiber according to claim 6, wherein the wet spinning technique comprises: providing the cellulose molecule solution having a selected concentration as the spinning solution and absolute ethyl alcohol as a coagulating bath, extruding the spinning solution through an injection pump so that the spinning solution flows into the coagulating bath, and the cellulose polymer in the cellulose molecule solution is subjected to the in-situ self-assembling and the hydrogen bond cross-linking reaction, and then performing the orientation treatment to obtain the cellulose gel fiber.

8. The preparation method of the super-tough cellulose aerogel fiber according to claim 7, wherein a concentration of the cellulose polymer in the cellulose molecule solution is 0.1-20 wt %.

9. The preparation method of the super-tough cellulose aerogel fiber according to claim 7, wherein a dissolution temperature of the cellulose polymer in the solvent is 50-100° C.; a dissolution time is 0.3-96 h.

10. The preparation method of the super-tough cellulose aerogel fiber according to claim 7, wherein process conditions adopted in the wet spinning technique comprise: a diameter of a extrusion needle head of the injection pump is 0.1 μm-1 cm, and an extrusion speed of the extrusion needle head of the injection pump is 0.1-1000 mL/min.

11. The preparation method of the super-tough cellulose aerogel fiber according to claim 7, wherein an orientation treatment method comprises any one, or a combination of two or more of a flow orientation, a stretching orientation, and a directional freezing orientation.

12. The preparation method of the super-tough cellulose aerogel fiber according to claim 6, wherein the replacement solvent comprises any one, or a combination of two or more of water, methanol, ethanol, tert-butanol, acetone, cyclohexane, and n-hexane.

13. The preparation method of the super-tough cellulose aerogel fiber according to claim 6, further comprising a drying treatment that comprises any one, or a combination of two or more of a supercritical fluid drying method, a vacuum freeze-drying method, and a vacuum drying method.

14. A textile prepared from the super-tough cellulose aerogel fiber according to claim 1.

15. The super-tough cellulose aerogel fiber according to claim 2, wherein the toughness of the super-tough cellulose aerogel fiber is not less than 5 MJ/m$^3$, with a diameter of 0.1 μm-1 mm, a specific area of 290-372 m$^2$/g, a porosity of 80-90%, and a density of 0.18-0.25 g/cm$^3$.

16. The super-tough cellulose aerogel fiber according to claim 3, wherein the toughness of the super-tough cellulose aerogel fiber is not less than 5 MJ/m$^3$, with a diameter of 0.1 μm-1 mm, a specific area of 290-372 m$^2$/g, a porosity of 80-90%, and a density of 0.18-0.25 g/cm$^3$.

17. The super-tough cellulose aerogel fiber according to claim 2, wherein the super-tough cellulose aerogel fiber has a maximum tensile strength of 17-30 MPa, an elongation at break of 82-110%, and the toughness of 5-25 MJ/m$^3$.

18. The super-tough cellulose aerogel fiber according to claim 3, wherein the super-tough cellulose aerogel fiber has a maximum tensile strength of 17-30 MPa, an elongation at break of 82-110%, and the toughness of 5-25 MJ/m$^3$.

19. The preparation method of the super-tough cellulose aerogel fiber according to claim 6, wherein in the super-tough cellulose aerogel fiber, a source of the cellulose polymer comprises any one, or a combination of two or more of polypolymerized cellulose, lignin fiber, cellulose ether, methylcellulose, hydroxypropylmethyl cellulose, hydroxyethyl cellulose, carboxymethyl cellulose, or a natural plant material;

and/or, the natural plant material comprises any one, or a combination of two or more of cotton, flax, a wood material, straw, husk, and bamboo;

and/or, the cellulose polymer has a degree of polymerization between 6000 and 11000.

* * * * *